(12) United States Patent
Ueki

(10) Patent No.: US 11,132,593 B2
(45) Date of Patent: Sep. 28, 2021

(54) RFID TAG AND RFID TAG-EQUIPPED ARTICLE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/080,972

(22) Filed: Oct. 27, 2020

(65) Prior Publication Data

US 2021/0042596 A1 Feb. 11, 2021

Related U.S. Application Data

(63) Continuation of application No. PCT/JP2020/001669, filed on Jan. 20, 2020.

(30) Foreign Application Priority Data

Jun. 12, 2019 (JP) .............................. JP2019-109603

(51) Int. Cl.
*G06K 19/07* (2006.01)
*G06K 19/077* (2006.01)

(52) U.S. Cl.
CPC ... *G06K 19/0723* (2013.01); *G06K 19/07758* (2013.01); *G06K 19/07773* (2013.01)

(58) Field of Classification Search
CPC ......... G06K 19/0723; G06K 19/07758; G06K 19/07773
USPC .......................................................... 235/492
See application file for complete search history.

(56) References Cited

U.S. PATENT DOCUMENTS

| | | | |
|---|---|---|---|
| 5,537,123 A | 7/1996 | Mandai et al. | |
| 10,062,956 B2 | 8/2018 | Ito | |
| 10,719,756 B2 | 7/2020 | Eshima et al. | |
| 2013/0307746 A1* | 11/2013 | Nakano ................ | H01Q 1/2225 343/850 |

(Continued)

FOREIGN PATENT DOCUMENTS

| | | |
|---|---|---|
| JP | H07202555 A | 8/1995 |
| JP | H07249925 A | 9/1995 |

(Continued)

OTHER PUBLICATIONS

Written Opinion of the International Searching Authority issued for PCT/JP2020/001669, dated Mar. 24, 2020.

(Continued)

*Primary Examiner* — Allyson N Trail
(74) *Attorney, Agent, or Firm* — Arent Fox LLP

(57) ABSTRACT

An RFID tag is provided that includes a first plane conductor; a second plane conductor that partially or entirely faces the first plane conductor; and an RFIC, a capacitor, an inductor, and terminals that form a part of a closed current loop. The closed current loop has two places with a large potential difference, including one place electrically connected to the first plane conductor, and the other place electrically connected to the second plane conductor. Moreover, the terminals are electrically connected to the second plane conductor and project outward from a region where the first plane conductor and the second plane conductor face each other.

21 Claims, 24 Drawing Sheets

(56) References Cited

U.S. PATENT DOCUMENTS

| | | | |
|---|---|---|---|
| 2014/0203981 A1* | 7/2014 | Nakano | H01Q 9/0407 |
| | | | 343/749 |
| 2017/0040663 A1 | 2/2017 | Ito | |
| 2019/0173178 A1 | 6/2019 | Kato | |
| 2019/0228283 A1 | 7/2019 | Eshima et al. | |
| 2020/0302260 A1* | 9/2020 | Ochi | G06K 19/0775 |

FOREIGN PATENT DOCUMENTS

| | | |
|---|---|---|
| JP | 2007035361 A | 2/2007 |
| JP | 2011204867 A | 10/2011 |
| JP | 2013004536 A | 1/2013 |
| WO | 2014003163 A1 | 1/2014 |
| WO | 2015166834 A1 | 11/2015 |
| WO | 2018092583 A1 | 5/2018 |
| WO | 2018110588 A1 | 6/2018 |

OTHER PUBLICATIONS

International Search Report issued for PCT/JP2020/001669, dated Mar. 24, 2020.
Japanese Office Action issued for JP 2020-546195, dated Dec. 8, 2020.

* cited by examiner

Fig.3
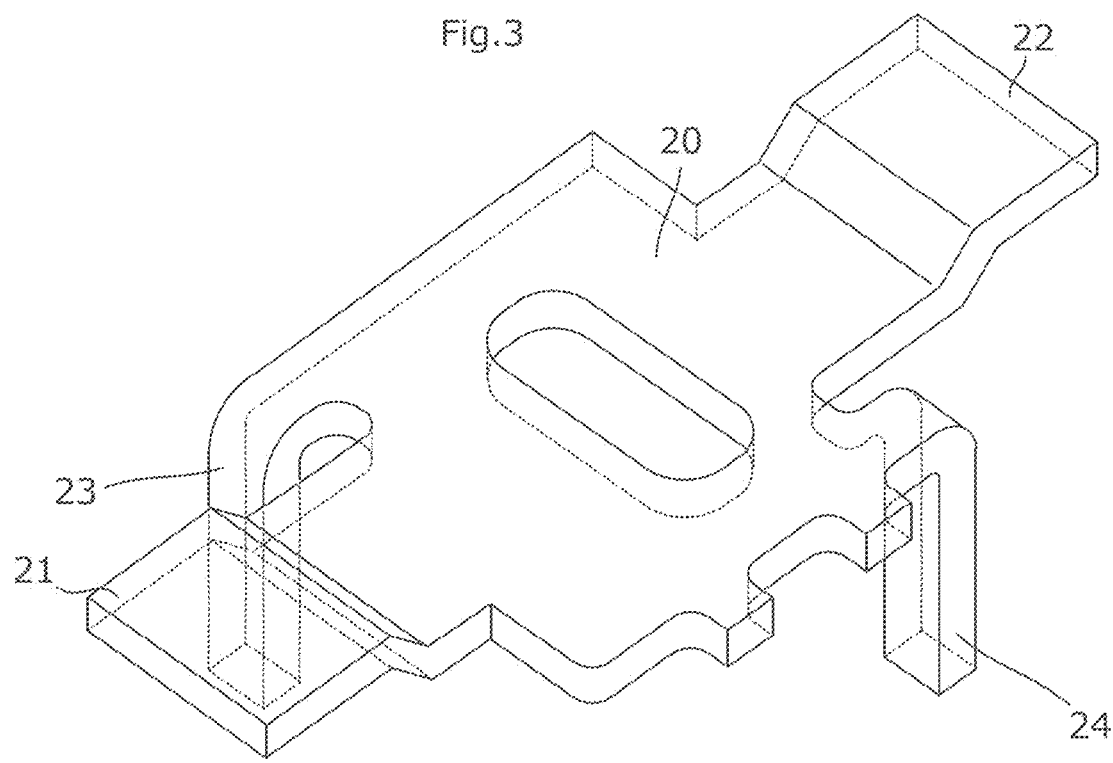
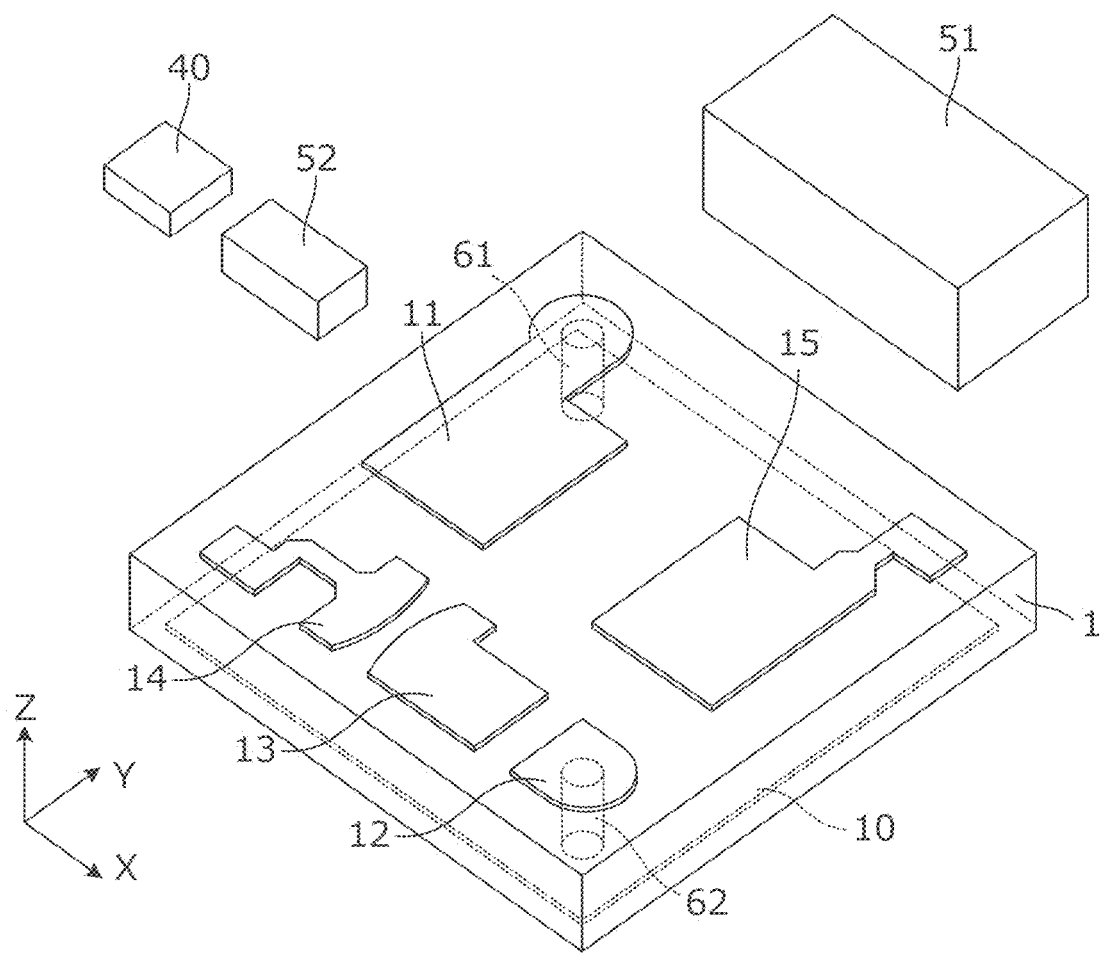

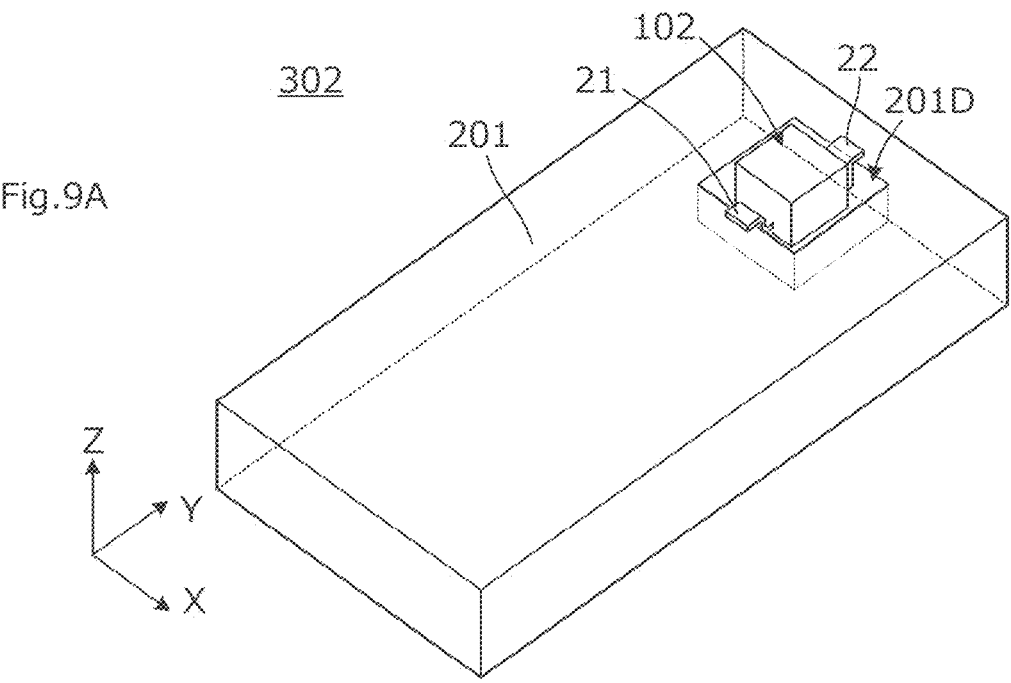
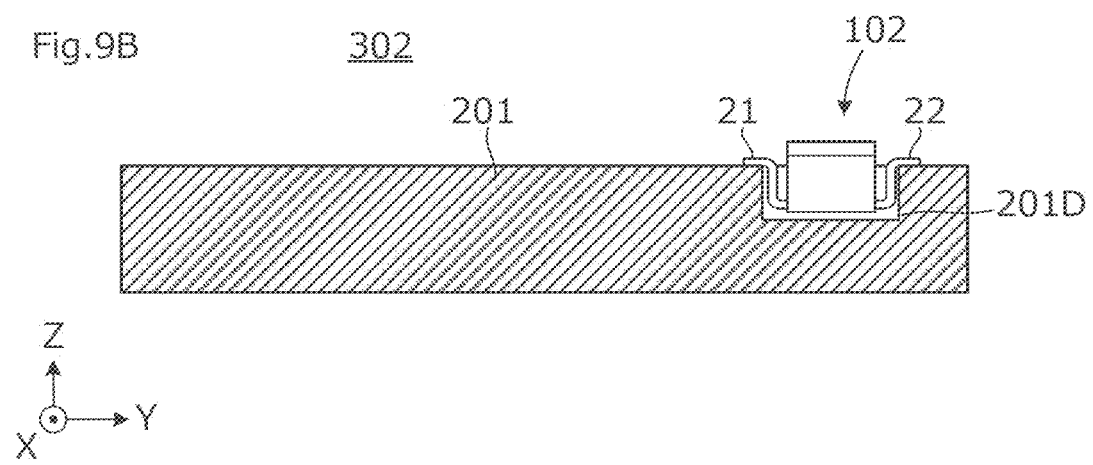

Fig.15
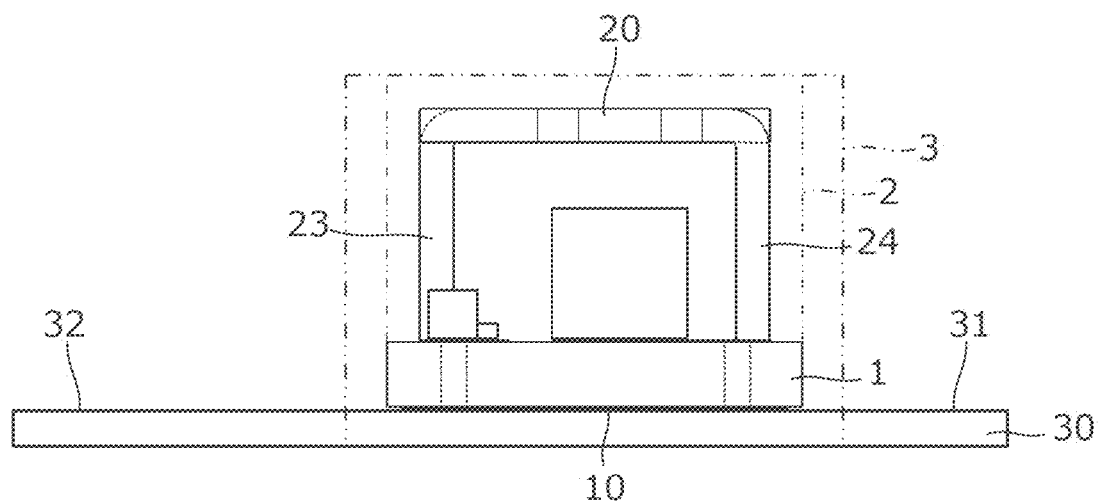
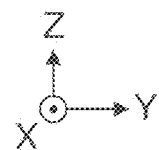

RFID TAG AND RFID TAG-EQUIPPED ARTICLE

CROSS REFERENCE TO RELATED APPLICATIONS

The present application is a continuation of PCT/JP2020/001669 filed Jan. 20, 2020, which claims priority to Japanese Patent Application No. 2019-109603, filed Jun. 12, 2019, the entire contents of each of which are incorporated herein by reference.

TECHNICAL FIELD

The present invention relates to an RFID tag attached to a metal article for use, and an RFID tag-equipped article including the metal article and the RFID tag.

BACKGROUND

Patent Document 1 (identified below) discloses an RFID tag attached to a metal object. The RFID tag includes an RFIC element and a loop-shaped electrode connected to the RFIC element. The loop-shaped electrode includes a plate-like electrode, a metal pin, and a conductor pattern.

The RFID tag of Patent Document 1 is bonded to a metal surface of an article with an adhesive layer interposed therebetween, for example. This configuration constitutes an RFID tag-equipped article.

Patent Document 1: International Publication No. 2018/092583.

The RFID tag-equipped article described in Patent Document 1 has a technical limitation in that the RFID tag bonded to a metal surface with an adhesive may fall off relatively easily due to environment (e.g., external factors) such as a surrounding atmosphere, liquid quality, temperature change, and an impact. For example, small steel products such as medical instruments are exposed to a high temperature environment during sterilization. Such a high temperature environment may cause a volatile chemical substance called outgas (i.e., release gas) to be released from the adhesive. This causes a problem in that a structure of the RFID tag-equipped article is not suitable to configure an RFID tag-equipped medical instrument.

SUMMARY OF THE INVENTION

Thus, it is an object of the exemplary embodiments of the present invention to provide an RFID tag and an RFID tag-equipped article that have high environmental resistance and are free from a risk of generation of released gas.

In an exemplary aspect, an RFID tag includes a first plane conductor, a second plane conductor that partially or entirely faces the first plane conductor, and an RFIC, a capacitor, and an inductor, forming a part of a closed current loop, and a terminal, The closed current loop has two places with a large potential difference, including one place electrically connected to the first plane conductor, and the other place electrically connected to the second plane conductor. The terminal is electrically connected to the second plane conductor, and projects outward from a region where the first plane conductor and the second plane conductor face each other.

In another exemplary aspect, an RFID tag is provided that includes a first plane conductor, a second plane conductor that partially or entirely faces the first plane conductor, a third plane conductor that is electrically connected to the first plane conductor or that allows a capacitance to be formed between the first plane conductor and the third plane conductor, and an RFIC, a capacitor, and an inductor, forming a part of a closed current loop, and a terminal. The closed current loop has two places with a large potential difference, including one place electrically connected to the first plane conductor, and the other place electrically connected to the second plane conductor. Moreover, the terminal is electrically connected to the third plane conductor, and projects outward from an outer edge of the first plane conductor.

RFID tag-equipped articles of the exemplary aspects include an RFID tag having a terminal and an article to which the terminal of the RFID tag is fixed, with the RFID tag having the configuration as described above.

The exemplary embodiments of the present invention provide for an RFID tag and an RFID tag-equipped article that have high environmental resistance and are free from a risk of generation of released gas.

BRIEF DESCRIPTION OF DRAWINGS

FIG. 3 is an exploded perspective view of a main part of the RFID tag 101.

FIG. 9A is a perspective view of an RFID tag-equipped article 302, and FIG. 9B is a sectional view of the RFID tag-equipped article 302, taken along a position passing through the article 201 without passing through the RFID tag 102.

FIG. 15 is a front view of the RFID tag 104A.

DETAILED DESCRIPTION OF EMBODIMENTS

Figure 1A:
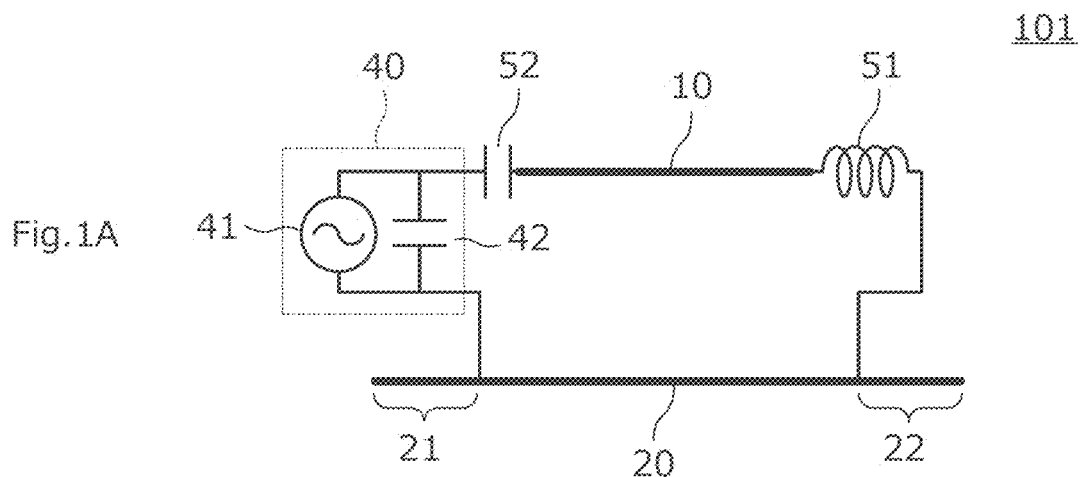
FIG. 1A is a circuit diagram of an RFID tag 101 according to a first exemplary embodiment.

Hereinafter, a plurality of exemplary aspects of the present invention will be shown with some specific examples with reference to the drawings. Each drawing shows the same portions designated by the same reference numerals. Although exemplary embodiments are shown separately in consideration of convenience in description of a main point or ease of understanding, configurations shown in different embodiments can be partially replaced or combined. In the second and subsequent embodiments, description of matters common to the first embodiment will be eliminated, and only different points will be described. In particular, similar effects obtained by similar configurations will not be sequentially described for each embodiment.

First Exemplary Embodiment

FIG. 1A is a circuit diagram of an RFID tag 101 according to a first embodiment. As shown, the RFID tag 101 includes a first plane conductor 10, a second plane conductor 20 that partially or entirely faces the first plane conductor 10, and an RFIC 40, a capacitor 52, an inductor 51, and the terminals 21 and 22, that form a part of a closed current loop.

The exemplary embodiment is configured such that a first end of the capacitor 52 and a first end of the inductor 51 are connected to the first plane conductor 10, a second end of the capacitor 52 is connected to the second plane conductor 20 through the RFIC 40, and a second end of the inductor 51 is connected to the second plane conductor 20. This configuration allows the RFIC 40, the capacitor 52, the first plane conductor 10, the inductor 51, and the second plane conductor 20 to form a closed current loop. Moreover, the exemplary embodiment is configured such that the RFIC 40 includes a communication circuit 41 and a built-in capacitor 42 for impedance matching.

According to the exemplary aspect, the closed current loop forms an LC resonance circuit including the capacitor 52 and the inductor 51, so that the first plane conductor 10 that is a connection point between the capacitor 52 and the inductor 51, and the second plane conductor 20 to which the second end of the inductor 51 is connected, have the largest potential difference therebetween at or near a resonance frequency. That is, two places having a large potential difference in the closed current loop include one place that is the first plane conductor 10, and a second place that is the second plane conductor 20.

The terminals 21 and 22 are each electrically connected to the second plane conductor 20 and project outward from a region where the first plane conductor 10 and the second plane conductor 20 face each other. Specific structures of the first plane conductor 10, the second plane conductor 20, and the terminals 21 and 22 will be described later.

Figure 1B:
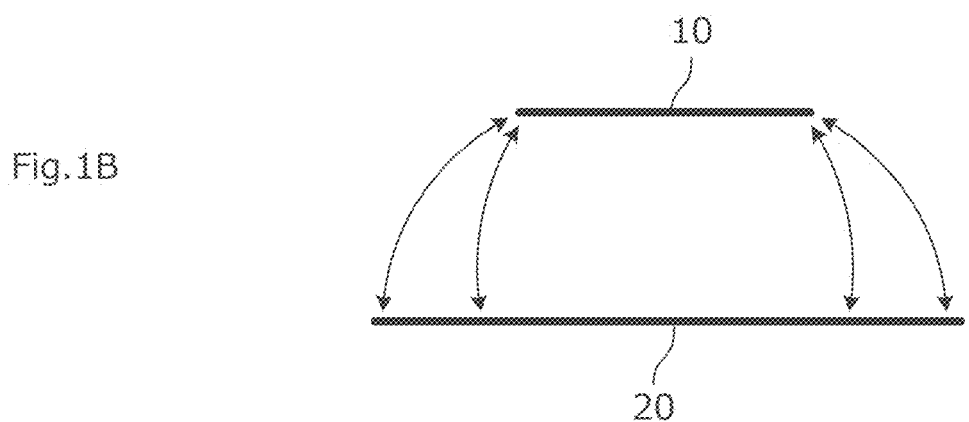
FIG. 1B is a diagram illustrating a state of an electric field generated between a first plane conductor 10 and a second plane conductor 20 of the RFID tag 101.

FIG. 1B is a diagram illustrating a state of an electric field generated between a first plane conductor 10 and a second plane conductor 20 of the RFID tag 101. FIG. 1B illustrates arrow lines that conceptually represent electric lines of force generated between the first plane conductor 10 and the second plane conductor 20. As illustrated in FIG. 1B, the first plane conductor 10 and the second plane conductor 20 facing each other with a dielectric (insulator) layer interposed therebetween form a structure like a patch antenna, and electric potentials applied to the first plane conductor 10 and the second plane conductor 20 are in an inverse (i.e., inverted) relationship. This configuration allows the first plane conductor 10 and the second plane conductor 20 to act as a radiation source of the antenna.

Figure 24A:
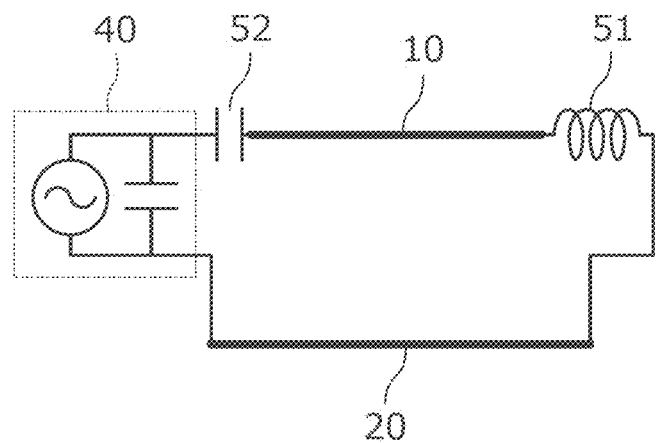
FIG. 24A is a circuit diagram of an RFID tag as a comparative example.
Figure 24B:
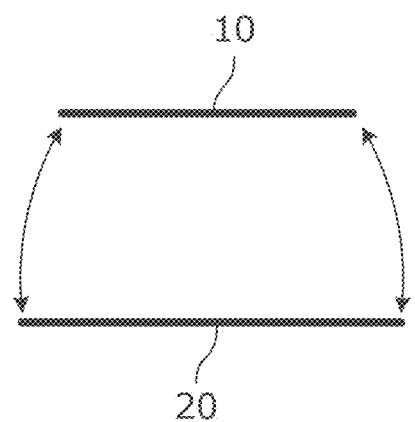
FIG. 24B is a diagram illustrating a state of an electric field generated between a first plane conductor 10 and a second plane conductor 20 of the RFID tag as a comparative example.

Here, FIG. 24A shows a circuit diagram of an RFID tag as a comparative example. FIG. 24B illustrates a state of an electric field generated between a first plane conductor 10 and a second plane conductor 20 of the RFID tag as a comparative example.

The RFID tag illustrated in FIG. 24A as a comparative example does not include the terminals 21 and 22 illustrated in FIG. 1A. The radiation source formed by the first plane conductor 10 and the second plane conductor 20 of the RFID tag 101 of the present embodiment is larger than the radiation source of the RFID tag as a comparative example. That is, the terminals 21 and 22 each act as a part of an electromagnetic field radiating section, so that the electromagnetic field radiating section is enlarged to obtain a high radiation capability.

Figure 2:
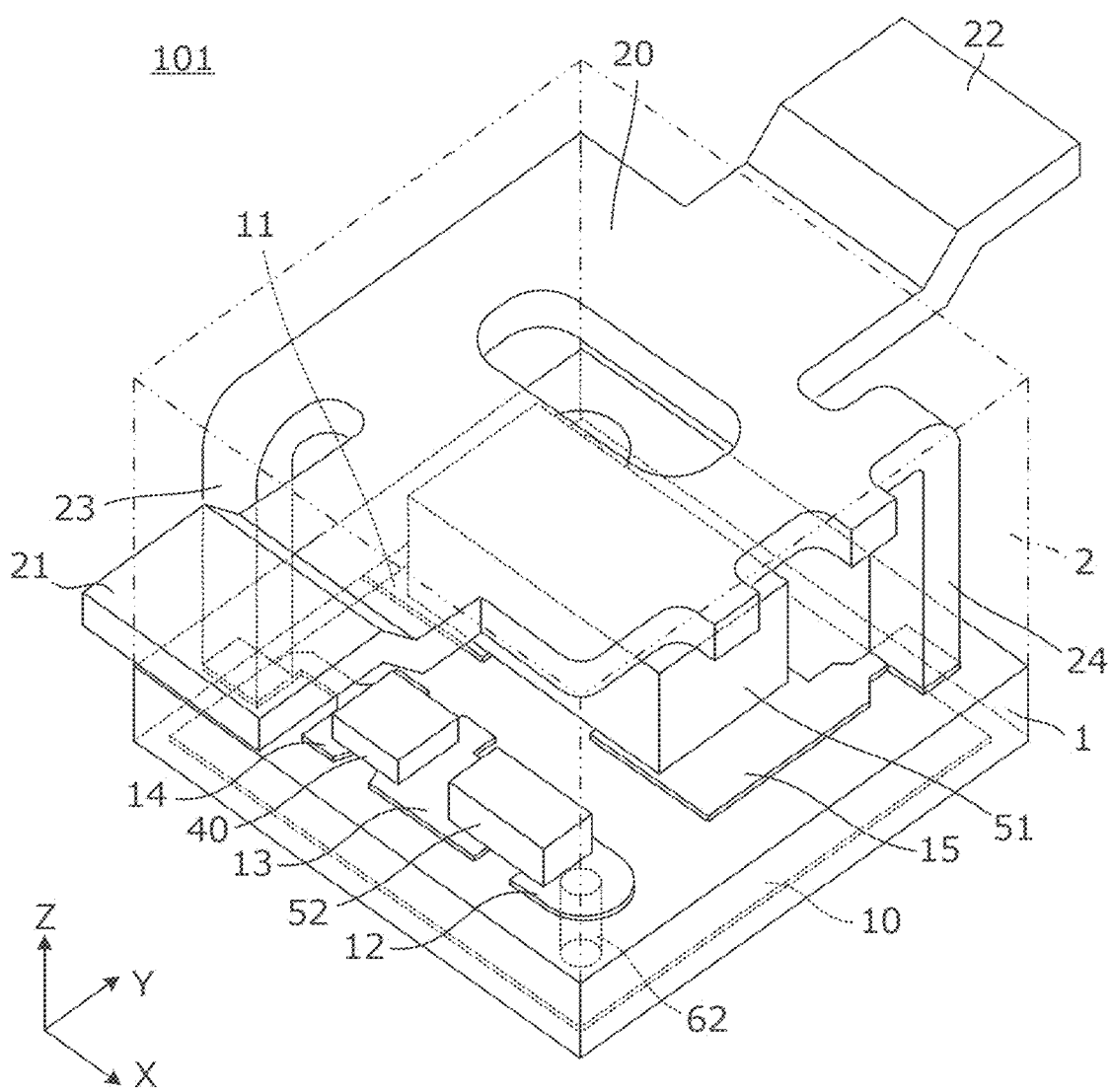
FIG. 2 is a perspective view of the RFID tag 101 according to the first exemplary embodiment.
Figure 4:
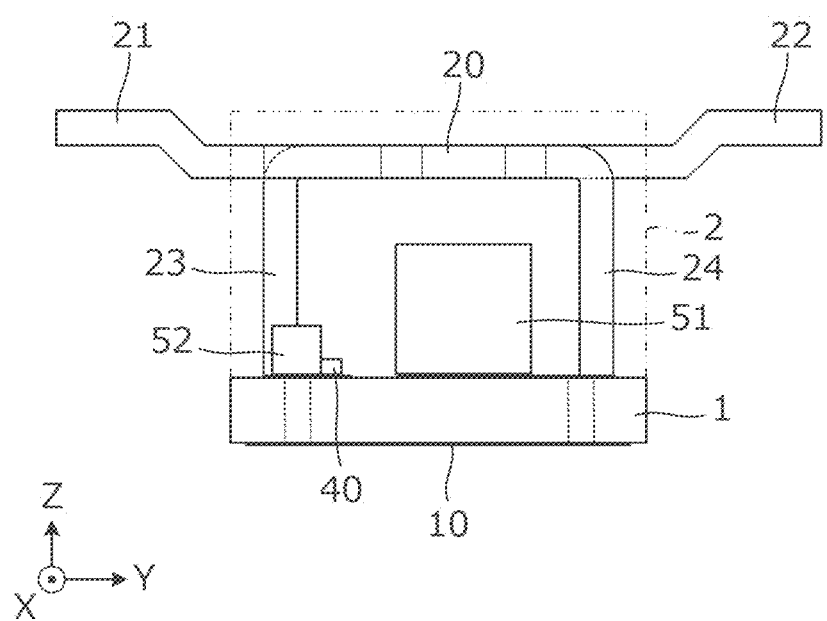
FIG. 4 is a front view of the RFID tag 101.

FIG. 2 is a perspective view of the RFID tag 101 according to the present embodiment, and FIG. 3 is an exploded perspective view of a main part of the RFID tag 101. FIG. 4 is a front view of the RFID tag 101.

As shown, the RFID tag 101 includes the second plane conductor 20, the first plane conductor 10, the RFIC 40, the inductor 51, and the capacitor 52. The second plane conductor 20, the terminals 21 and 22, and legs 23 and 24 are each a part of a single metal member, and these are integrated in an exemplary aspect. For example, the second plane conductor 20, the terminals 21 and 22, and the legs 23 and 24 are sections formed by sheet metal working such as punching and bending. As the sheet metal, for example, a stainless steel sheet or an iron-nickel alloy sheet such as a 42 Alloy is used. The first plane conductor 10 is a copper foil pattern formed on a lower surface of an insulating base material 1. Electrodes 11, 12, 13, 14, and 15 are provided on upper surface of the insulating base material 1. Via conductors 61 and 62 are provided inside of the insulating base material 1. The via conductor 61 connects the first plane conductor 10 and the electrode 11, and the via conductor 62 connects the first plane conductor 10 and the electrode 12.

As illustrated in FIG. 3, the RFIC 40, the inductor 51, and the capacitor 52 are mounted on the corresponding electrodes 11, 12, 13, 14, and 15 on the upper surface of the insulating base material 1. The leg 23 of the second plane conductor 20 is connected to the electrode 14, and the leg 24 thereof is connected to the electrode 15. These legs are connected by soldering, for example. In this state, the second plane conductor 20 and the first plane conductor 10 face each other parallel.

FIG. 2 illustrates a coating range of an insulator layer 2 using a two-dot chain line. In this way, the insulator layer 2 is coated on an upper portion of the insulating base material 1. This insulator layer 2 is made of an epoxy resin, for example.

For example, in an exemplary aspect, the RFID tag 101 has a height of 2 mm, a length of 2.5 mm of one side of a bottom surface of the RFID tag 101, a thickness of 0.4 mm of the insulating base material 1, and a height of 1.25 mm from the upper surface of the insulating base material 1 to an inner top surface of the second plane conductor 20. The RFIC 40 processes a communication signal having a frequency of a 900 MHz band (860 MHz to 960 MHz), for example.

As illustrated in FIGS. 2 and 4, the terminals 21 and 22 are electrically connected to the second plane conductor 20 and project outward from the region where the first plane conductor 10 and the second plane conductor 20 face each other.

The present embodiment allows the terminals 21 and 22 of the RFID tag 101 to act as a part of the electromagnetic field radiating section, and thus, even when the terminals 21 and 22 of the RFID tag 101 are attached to an insulator, the electromagnetic field radiating section is enlarged to obtain a high radiation capability.

Second Exemplary Embodiment

A second embodiment shows an RFID tag-equipped article including the RFID tag 101 shown in the first embodiment.

Figure 5:
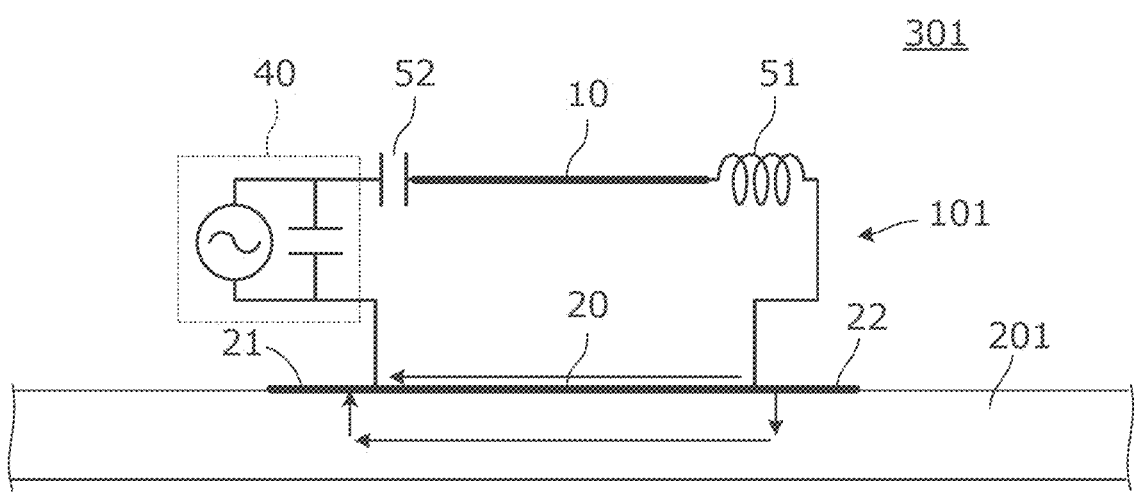
FIG. 5 is a circuit diagram of an RFID tag-equipped article 301 according to a second exemplary embodiment.
Figure 6A:
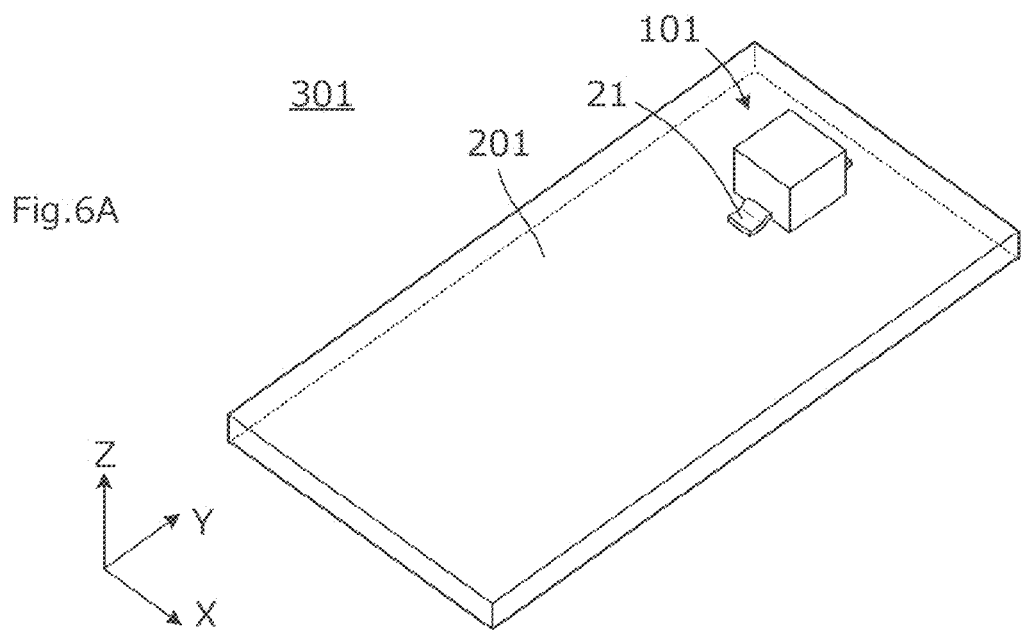
FIG. 6A is a perspective view of the RFID tag-equipped article 301.
Figure 6B:
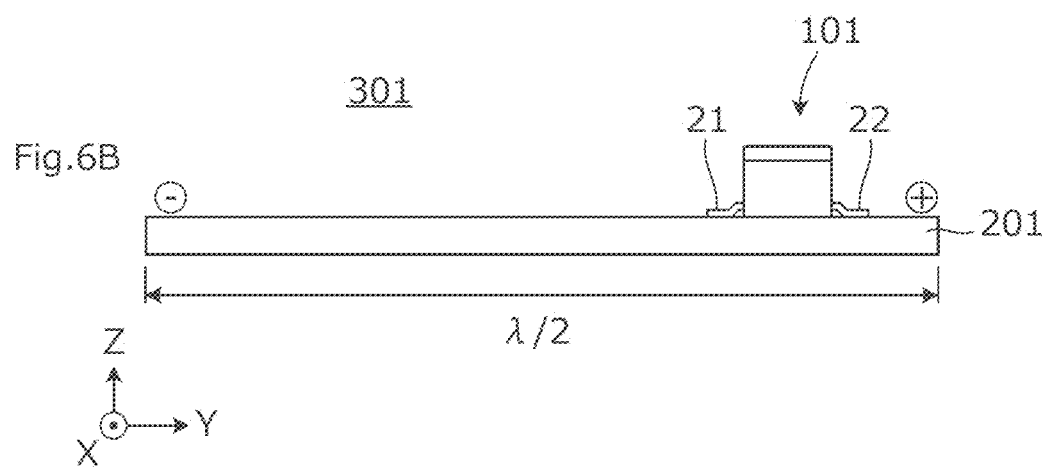
FIG. 6B is a front view of the RFID tag-equipped article 301.

FIG. 5 is a circuit diagram of an RFID tag-equipped article 301 according to the second embodiment. FIG. 6A is a perspective view of the RFID tag-equipped article 301, and FIG. 6B is a front view of the RFID tag-equipped article 301. The RFID tag-equipped article 301 is formed by attaching the RFID tag 101 to an article 201. The article 201 is a metal plate, for example.

FIG. 5 illustrates an arrow line along the second plane conductor 20 that shows a path of an electric current flowing through the second plane conductor 20, and an arrow line in the article 201 that shows a path of an electric current flowing through the article 201. The two paths of electric currents are almost equal in length (electrical length). Thus, a resonance frequency caused by the closed loop has a small change between the RFID tag 101 alone state and a state where the RFID tag 101 is attached to the article 201. That is, the resonance frequency is stable regardless of whether an article to which the RFID tag 101 is attached is a conductor or an insulator, or regardless of a size of a conductor portion.

FIGS. 6A and 6B each illustrate the article 201 that is a metal plate. The RFID tag 101 includes terminals 21 and 22 that are welded or screwed to a surface of the article 201. This welding is performed by, for example, a resistance spot welding method or a laser spot welding method. When the terminals 21 and 22 are each made of a stainless steel plate or a plate of iron-nickel alloy such as a 42 Alloy, an electric resistance value is higher than Cu or Al, and thus facilitating spot welding.

The exemplary embodiment is configured such that the article 201 has a shape with a longitudinal direction parallel to a Y-axis illustrated in FIGS. 6A and 6B, and that the RFID tag 101 is attached near a longitudinal end of the article 201. The article 201 has a longitudinal length of ½ wavelength or about ½ wavelength of a communication frequency. Thus, as indicated by plus/minus symbols in FIG. 6B, the article 201 resonates at the ½ wavelength and acts as a radiation element. That is, the RFID tag-equipped article 301 has a higher radiation capability than the RFID tag 101 alone.

Third Exemplary Embodiment

A third embodiment shows an RFID tag having a terminal shape different from that of the RFID tag 101 shown in the first embodiment, and an RFID tag-equipped article including the RFID tag.

Figure 7:
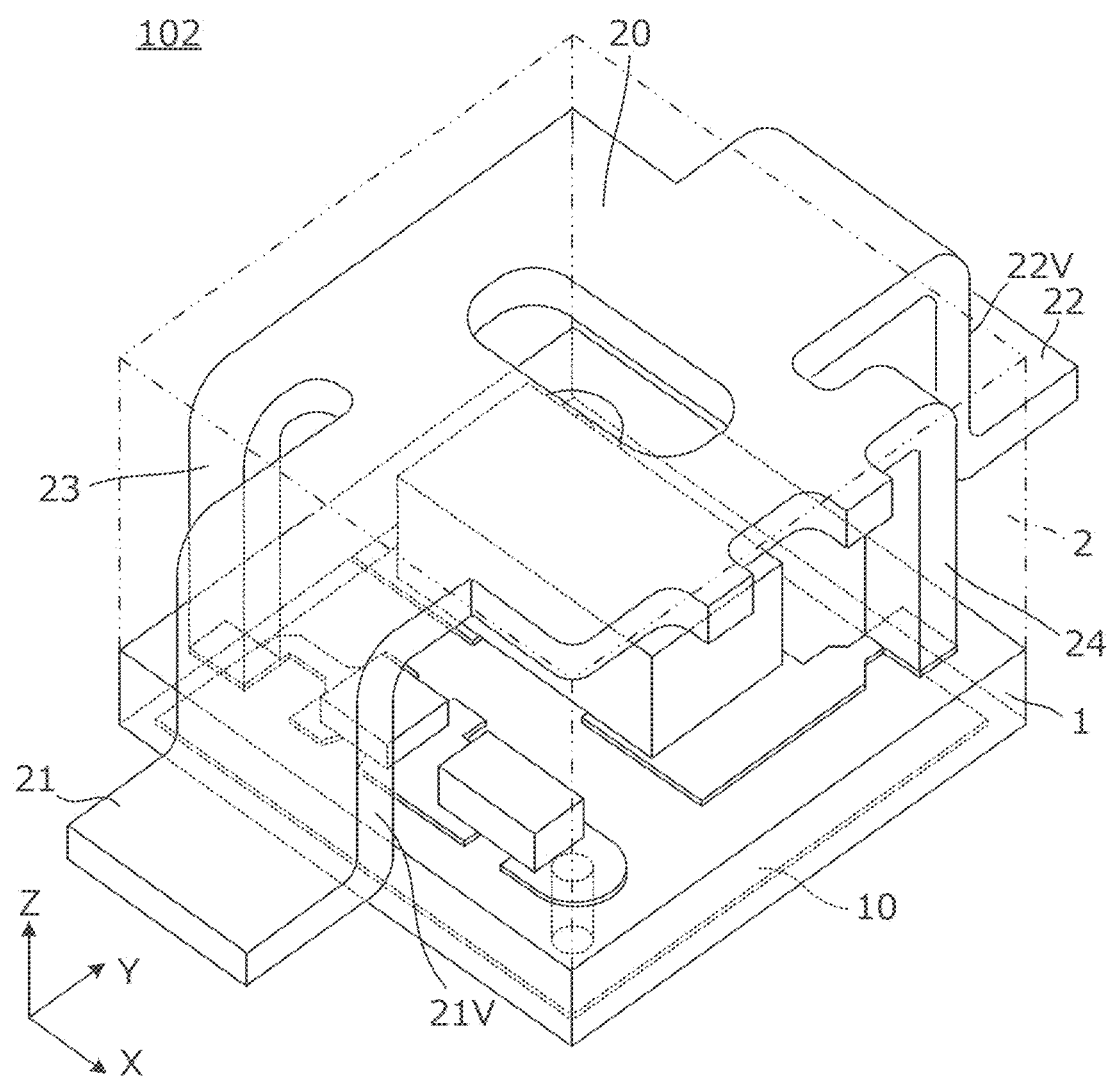
FIG. 7 is a perspective view of an RFID tag 102 according to a third exemplary embodiment.
Figure 8:
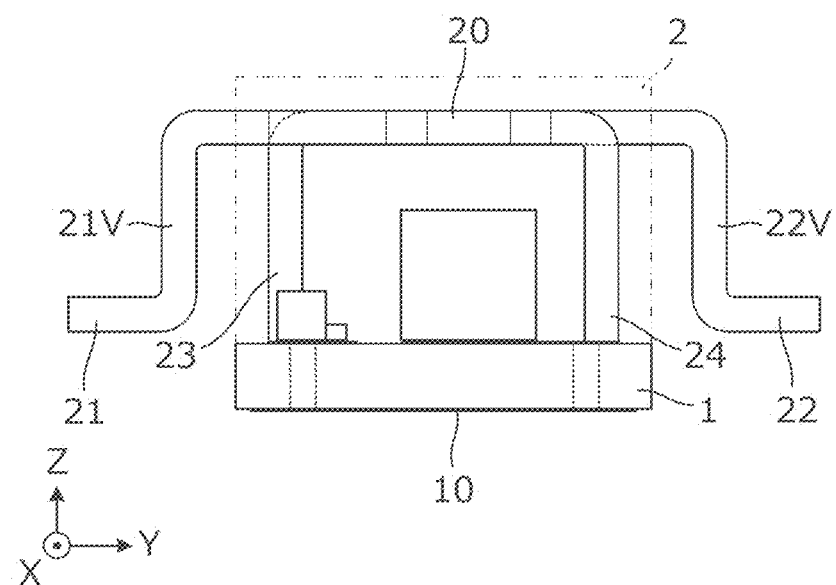
FIG. 8 is a front view of the RFID tag 102.

FIG. 7 is a perspective view of an RFID tag 102 according to the third embodiment, and FIG. 8 is a front view of the RFID tag 102.

The RFID tag 102 includes a second plane conductor 20 and a first plane conductor 10. The second plane conductor 20, the terminals 21 and 22, and legs 23 and 24 are each a part of a single metal member, and these are integrated. As further shown, the RFID tag 102 is different in shapes of the terminals 21 and 22 from the RFID tag 101 illustrated in FIG. 2. The terminals 21 and 22 of the RFID tag 102 of the third embodiment respectively include extension portions 21V and 22V extending from the second plane conductor 20 toward the first plane conductor 10, and the terminals 21 and 22 each have an end located near the first plane conductor 10. Other configurations are the same as those of the RFID tag 101.

FIG. 9A is a perspective view of an RFID tag-equipped article 302, and FIG. 9B is a sectional view of the RFID tag-equipped article 302, taken along a position passing through an article 201 without passing through the RFID tag 102. The RFID tag-equipped article 302 is formed by attaching the RFID tag 102 to the article 201. The article 201 is a metal body, for example.

The article 201 is formed with a fitting portion 201D. The RFID tag 102 is fitted into the fitting portion 201D, and the terminals 21 and 22 are welded or screwed to the article 201.

The RFID tag 102 partially projects from a surface of the article 201 even when fitted into the fitting portion 201D. This structure prevents the RFID tag 102 from being completely shielded by the article 201, and thus communication characteristics can be further improved.

Fourth Exemplary Embodiment

A fourth embodiment shows an RFID tag having a single terminal and an RFID tag-equipped article including the RFID tag.

Figure 10:
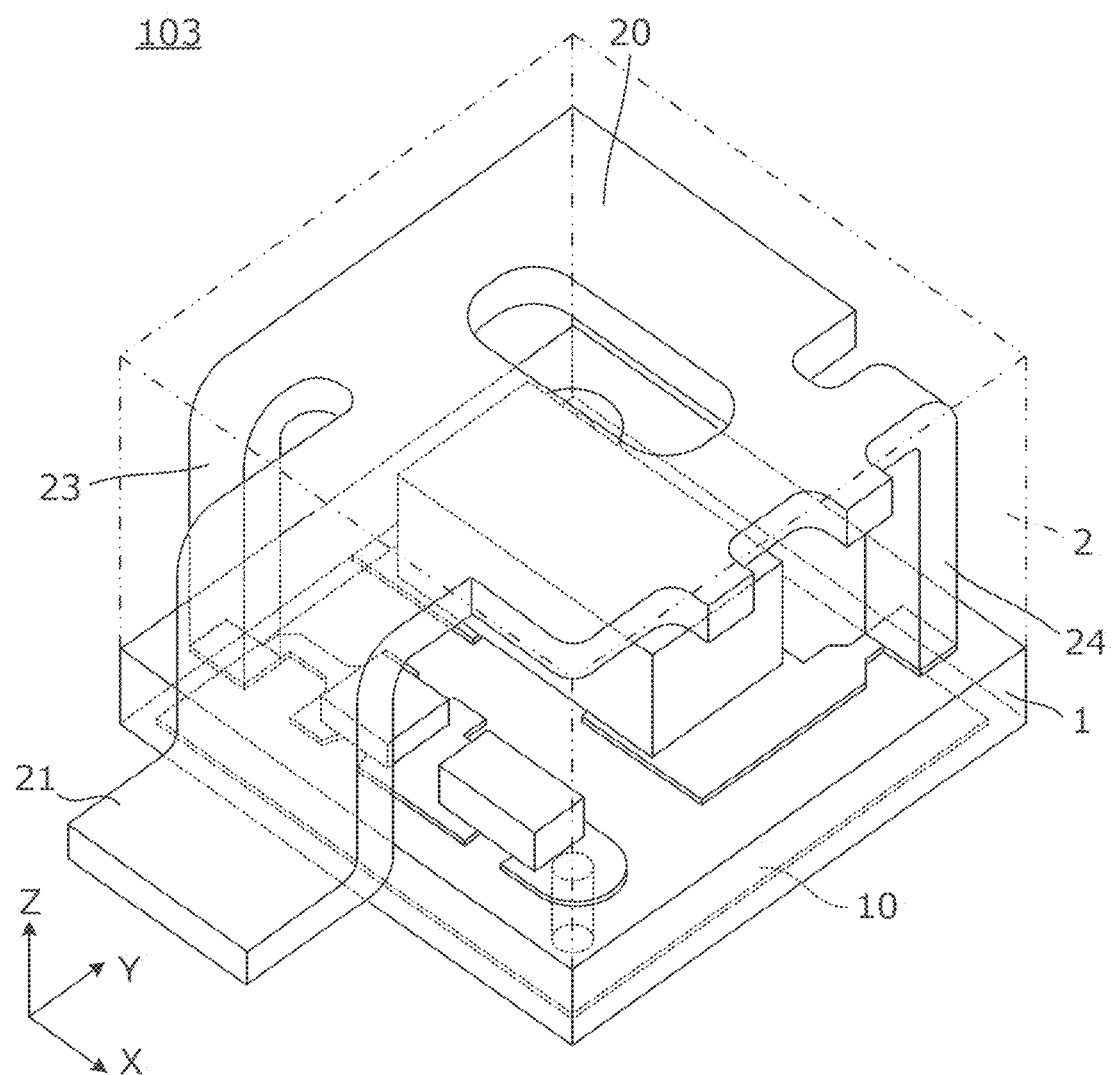
FIG. 10 is a perspective view of an RFID tag 103 according to a fourth exemplary embodiment.
Figure 11:
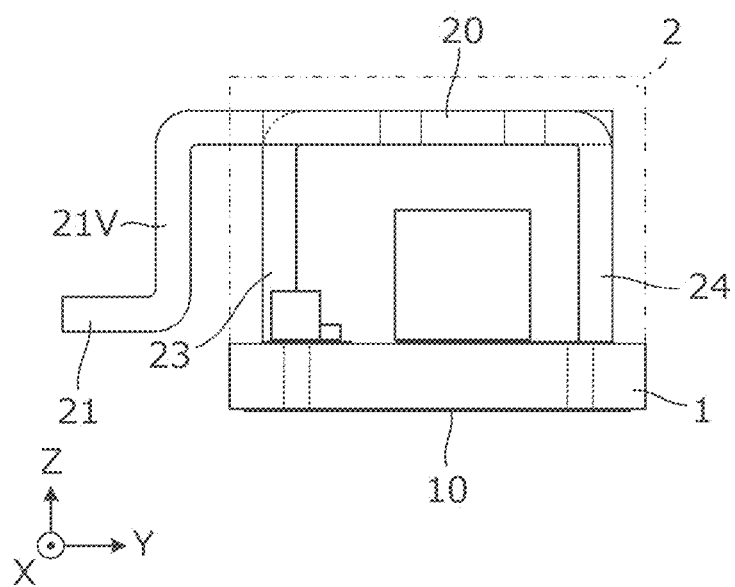
FIG. 11 is a front view of the RFID tag 103.

FIG. 10 is a perspective view of an RFID tag 103 according to the fourth embodiment, and FIG. 11 is a front view of the RFID tag 103.

The RFID tag 103 includes a second plane conductor 20 and a first plane conductor 10. The second plane conductor 20, a terminal 21, and legs 23 and 24 are each a part of a single metal member, and these are integrated. Unlike the RFID tag 102 illustrated in FIG. 7, the RFID tag 103 includes the single terminal 21. It is noted that other configurations are the same as those of the RFID tag 102.

Figure 12A:
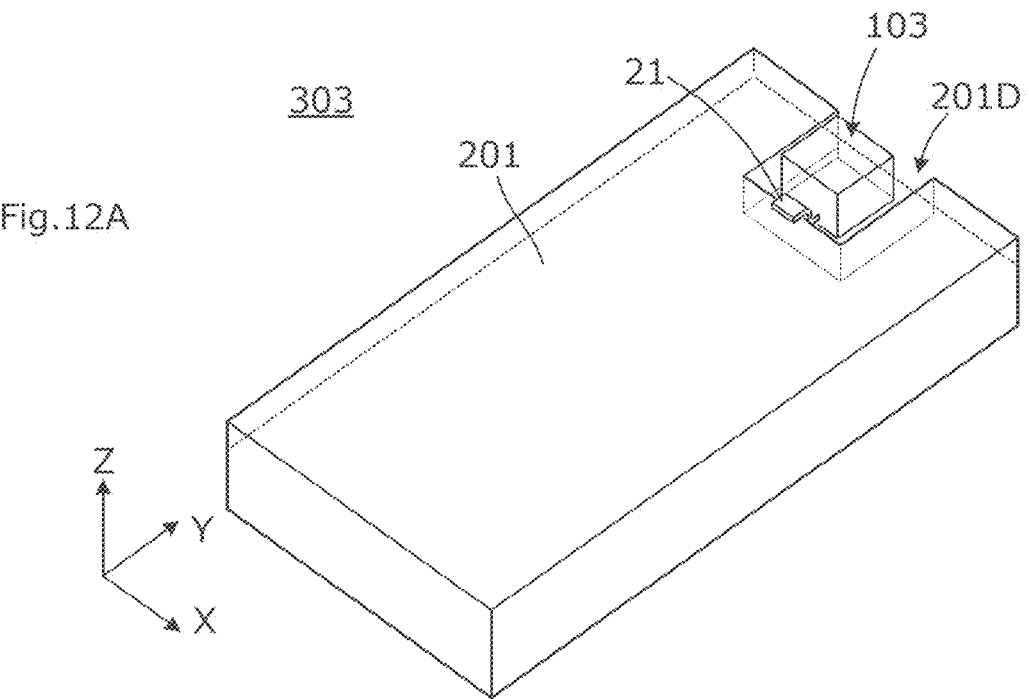
FIG. 12A is a perspective view of an RFID tag-equipped article 303.
Figure 12B:
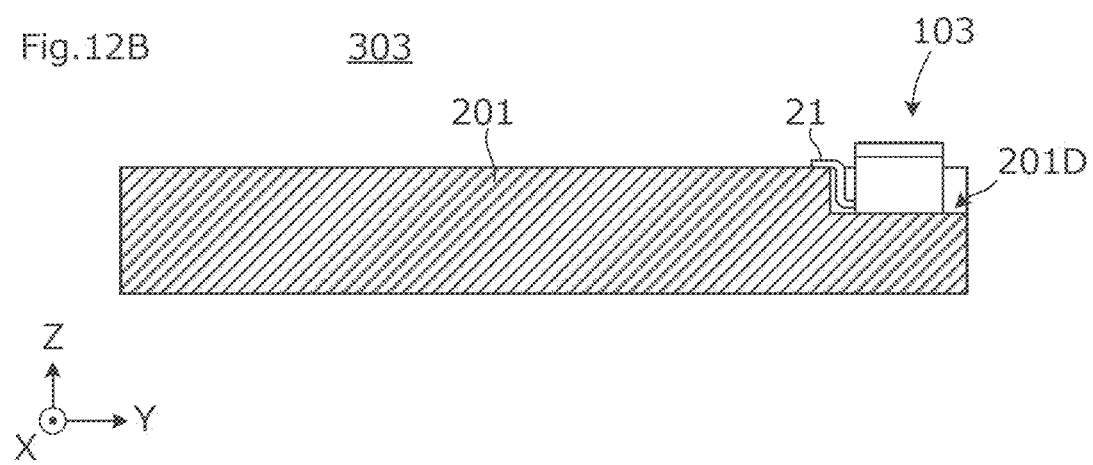
FIG. 12B is a sectional view of the RFID tag-equipped article 303, taken along a position passing through the article 201 without passing through the RFID tag 103.

FIG. 12A is a perspective view of an RFID tag-equipped article 303, and FIG. 12B is a sectional view of the RFID tag-equipped article 303, taken along a position passing through an article 201 without passing through the RFID tag 103. The RFID tag-equipped article 303 is formed by attaching the RFID tag 103 to the article 201. The article 201 is a metal body, for example.

The article 201 is formed with a fitting portion 201D. The RFID tag 103 is fitted into the fitting portion 201D, and the terminal 21 is welded or screwed to the article 201. As shown in the exemplary embodiment, the RFID tag may be disposed in an end portion of an article.

When four side surfaces of an RFID tag are surrounded by metal, the metal blocks electromagnetic field radiation from the RFID tag, and thus deteriorating communication characteristics. In contrast, the present embodiment allows a part of each of side surfaces of the RFID tag 103 to be opened, so that a surface inhibiting electromagnetic field radiation is reduced, and thus improving communication characteristics.

Fifth Exemplary Embodiment

A fifth embodiment shows an RFID tag including a third plane conductor 30.

Figure 13A:
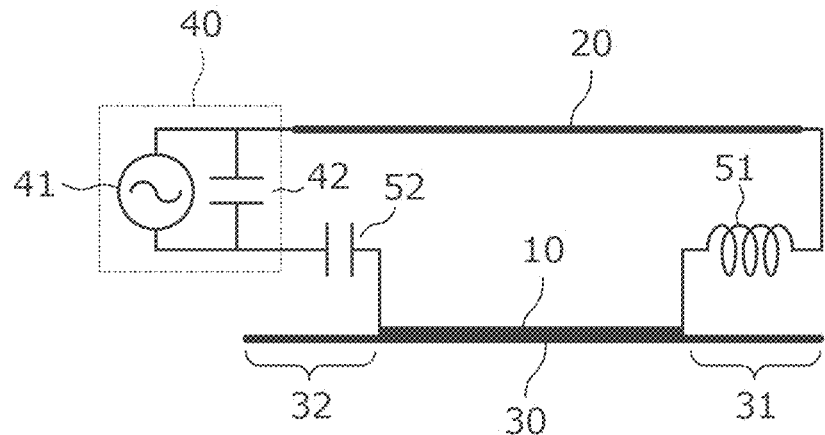
FIG. 13A is a circuit diagram of an RFID tag 104A according to a fifth exemplary embodiment.
Figure 13B:
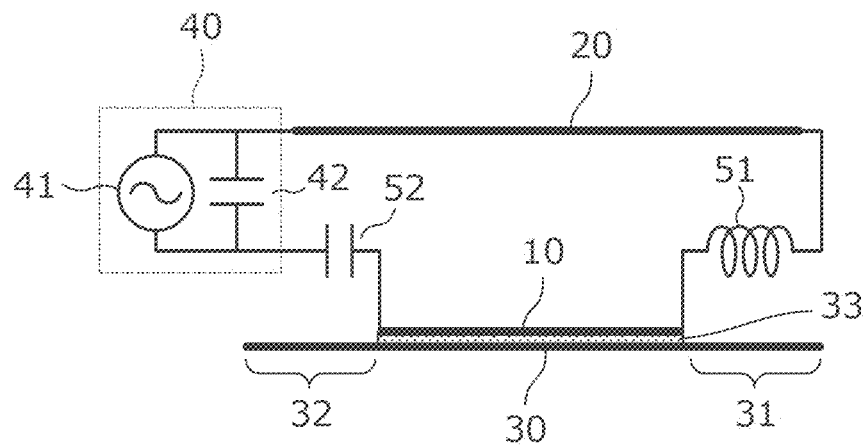
FIG. 13B is a circuit diagram of another RFID tag 104B according to the fifth exemplary embodiment.

FIG. 13A is a circuit diagram of an RFID tag 104A according to the fifth embodiment, and FIG. 13B is a circuit diagram of another RFID tag 104B according to the fifth embodiment. The RFID tags 104A and 104B each include a first plane conductor 10, a second plane conductor 20, a third plane conductor 30, an RFIC 40, a capacitor 52, an inductor 51, and terminals 31 and 32. The RFIC 40, the capacitor 52 and the inductor 51 form a part of a closed current loop. The second plane conductor 20 partially or entirely faces the first plane conductor 10.

The RFID tag 104A includes the third plane conductor 30 that is in contact with the first plane conductor 10 to be electrically connected thereto. The terminals 31 and 32 are electrically connected to the third plane conductor 30 and project outward from an outer edge of the first plane conductor 10.

As further shown, the RFID tag 104B includes a dielectric layer 33 formed between the first plane conductor 10 and the third plane conductor 30, and a capacitance formed between the first plane conductor 10 and the third plane conductor 30. The terminals 31 and 32 are electrically connected to the third plane conductor 30 and project outward from an outer edge of the first plane conductor 10.

Figure 14:
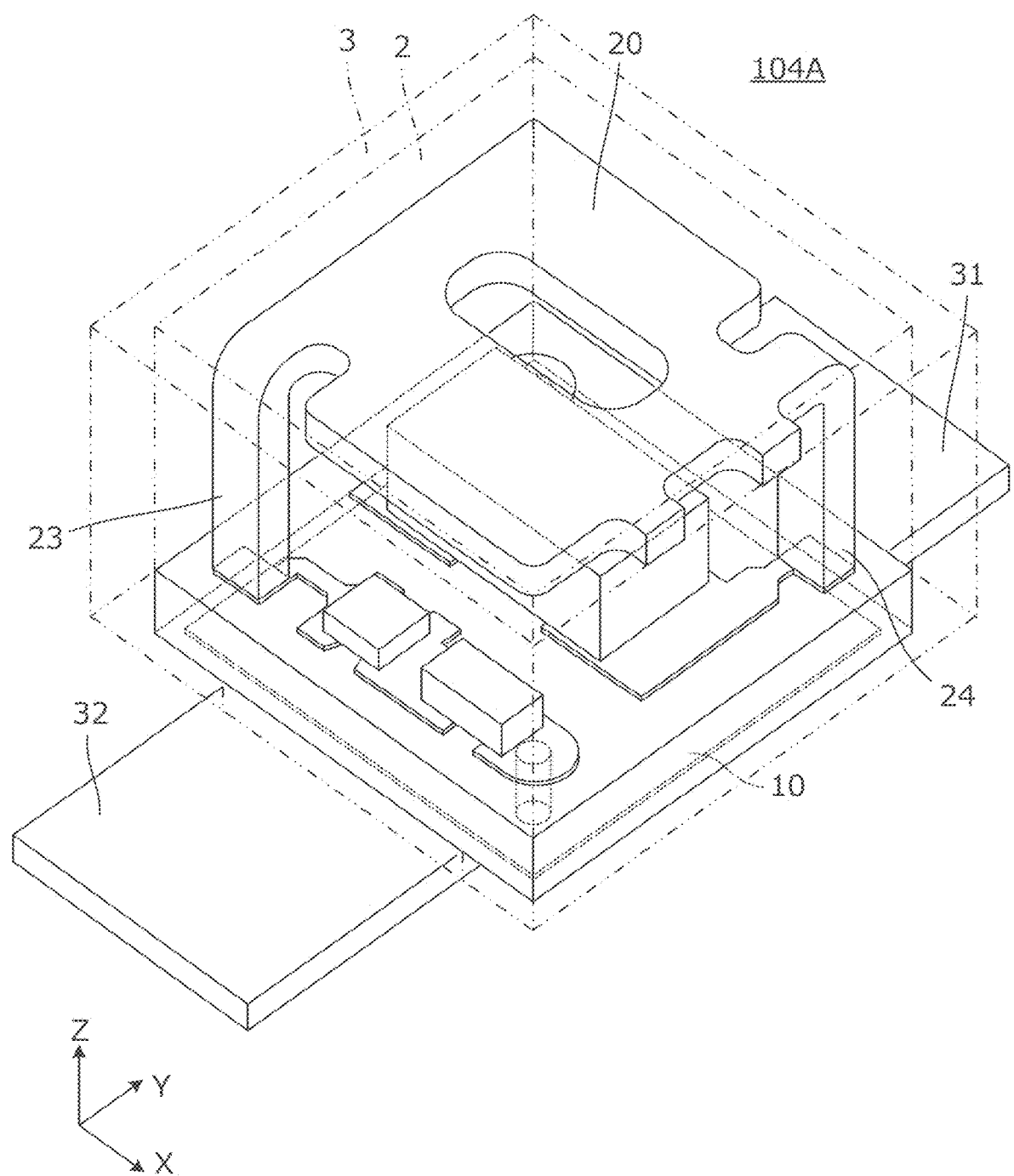
FIG. 14 is a perspective view of the RFID tag 104A.

FIG. 14 is a perspective view of the RFID tag 104A according to the present embodiment, and FIG. 15 is a front view of the RFID tag 104A.

The RFID tag 104A includes an RFID tag body provided with the first plane conductor 10 and the second plane conductor 20, and the third plane conductor 30. The RFID tag body has the same configuration as the RFID tag described in each of the embodiments above. However, the RFID tag 104A does not include terminals 21 and 22 in this embodiment.

The third plane conductor 30 and the terminals 31 and 32 are each a part of a single metal member, and these are integrated according to the exemplary aspect. The third plane conductor 30 is bonded to the first plane conductor 10 with a conductive paste interposed therebetween. That is, the third plane conductor 30 is electrically connected to the first plane conductor 10.

The periphery of the RFID tag body and side portions of the third plane conductor 30 are covered with an insulator layer 3.

When the third plane conductor 30 is bonded to the first plane conductor 10 with an insulating paste interposed therebetween in FIGS. 14 and 15, the RFID tag 104B illustrated in FIG. 13B is obtained.

Besides the conductive paste or insulating paste described above, an epoxy double-sided adhesive tape such as a die attach tape may be used according to alternative aspects.

Each of the RFID tags 104A and 104B of the exemplary embodiment includes the third plane conductor 30 that acts as a radiation source. The terminals 31 and 32 each act as a part of the electromagnetic field radiating section, and thus, even when the terminals 31 and 32 of the RFID tag 104A and 104B are attached to an insulator, the electromagnetic field radiating section is enlarged to obtain a high radiation capability.

When the third plane conductor 30, and the terminals 31 and 32, are each made of stainless steel or an iron-nickel alloy such as a 42 Alloy, an electric resistance value is higher than Cu or Al, and thus facilitating spot welding. In contrast, the second plane conductor 20, and the legs 23 and 24, are not required to be welded, and thus may be formed by sheet metal working, such as punching and bending, using a copper plate. This enables reducing a conductor loss of a resonance circuit.

Sixth Exemplary Embodiment

A sixth embodiment shows an RFID tag including a third plane conductor 30, and an RFID tag-equipped article including the RFID tag.

Figure 16:
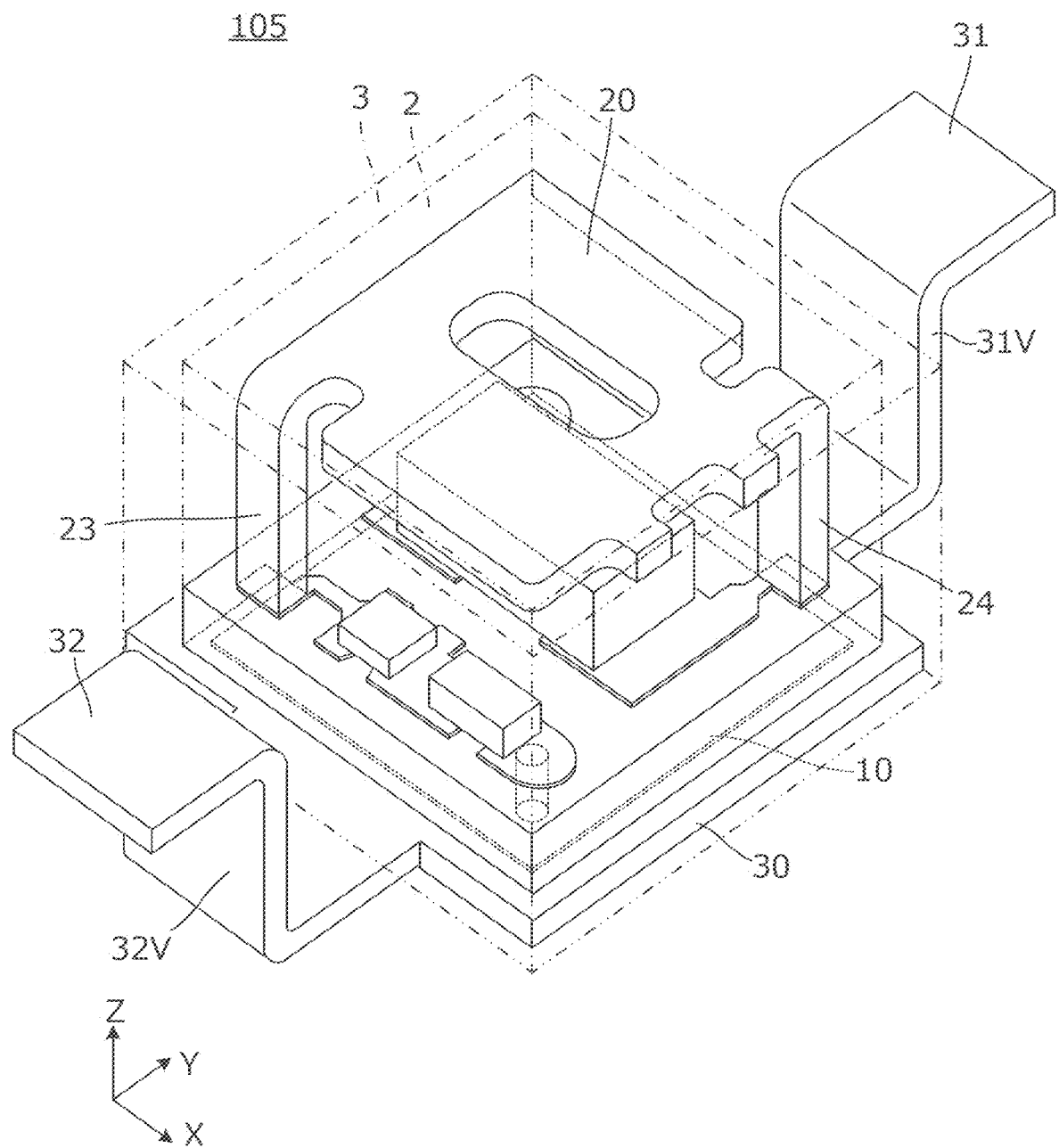
FIG. 16 is a perspective view of an RFID tag 105 according to a sixth exemplary embodiment.
Figure 17:
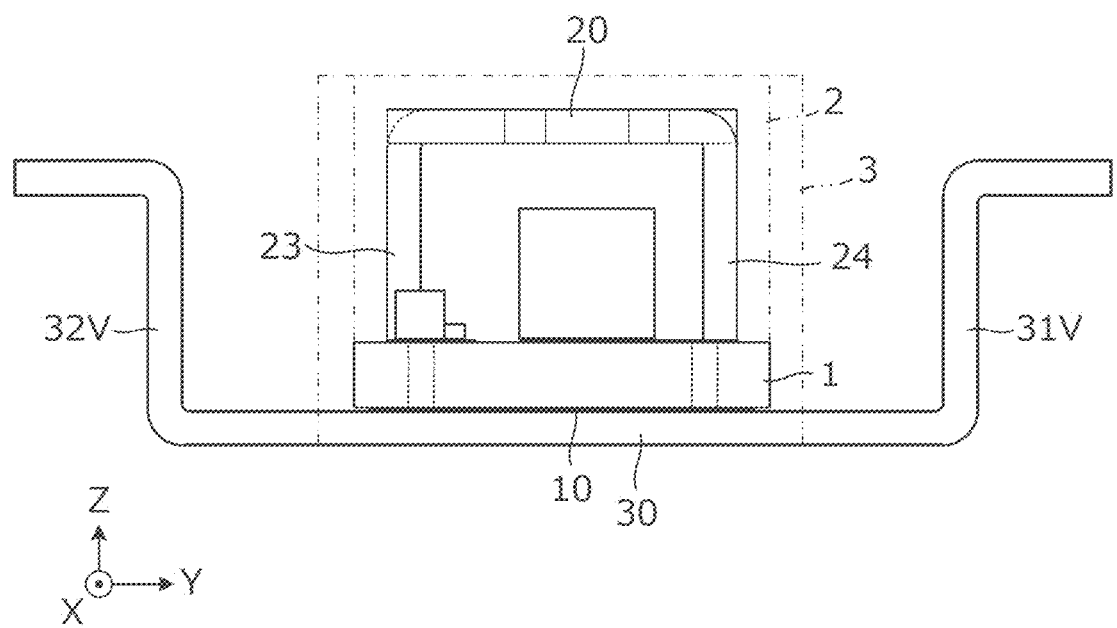
FIG. 17 is a front view of the RFID tag 105.

FIG. 16 is a perspective view of an RFID tag 105 according to the sixth embodiment, and FIG. 17 is a front view of the RFID tag 105.

The RFID tag 105 includes an RFID tag body provided with a first plane conductor 10 and a second plane conductor 20, and the third plane conductor 30. The RFID tag 105 is different in shapes of the terminals 31 and 32 from the RFID tag 104A illustrated in FIG. 14. The terminals 31 and 32 of the RFID tag 105 of the sixth embodiment respectively include extension portions 31V and 32V extending from the third plane conductor 30 toward the second plane conductor 20, and the terminals 31 and 32 each have an end located near the second plane conductor 20. It is noted that other configurations are the same as those of the RFID tags 104A and 104B as described above.

Figure 18A:
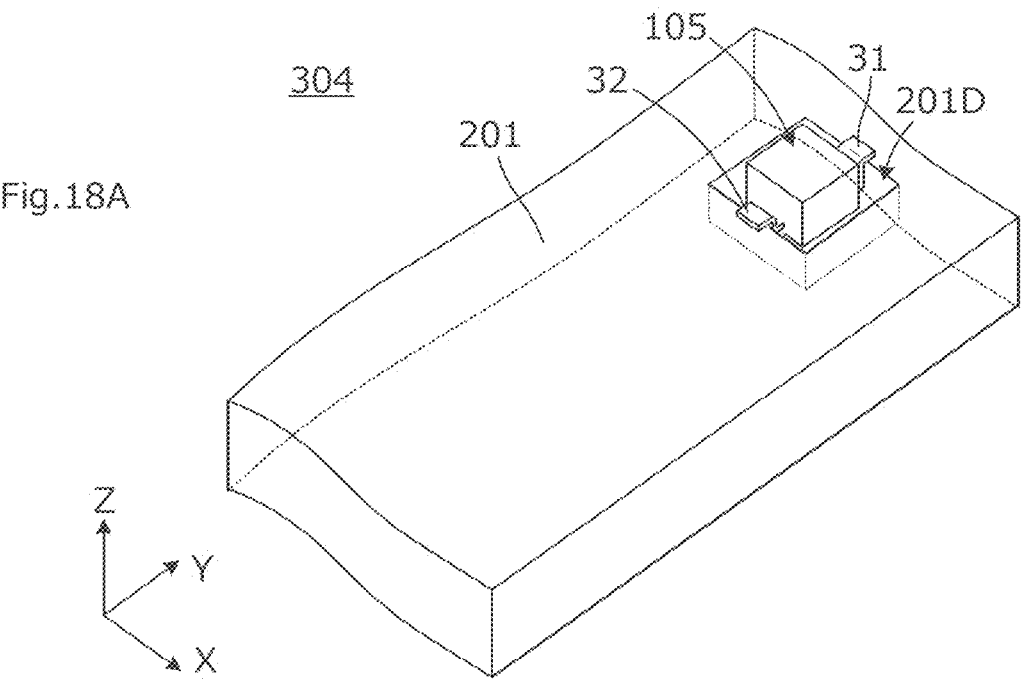
FIG. 18A is a perspective view of an RFID tag-equipped article 304.
Figure 18B:
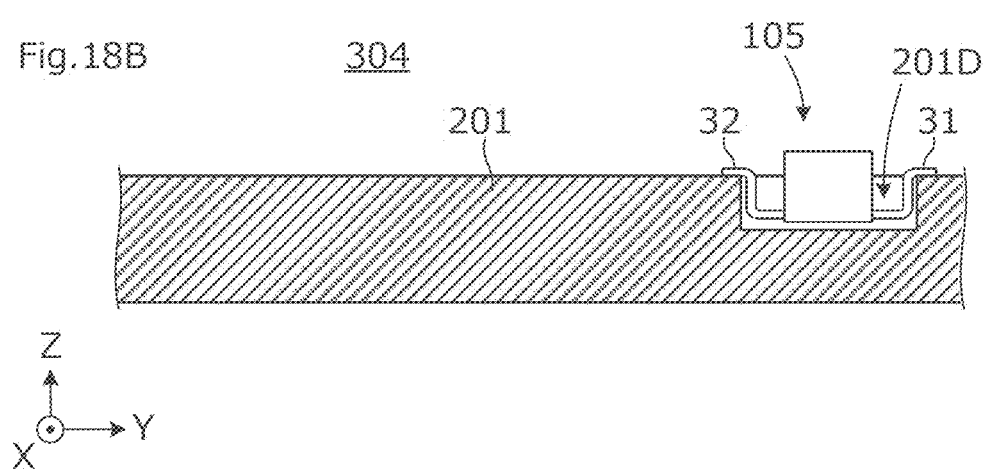
FIG. 18B is a sectional view of the RFID tag-equipped article 304, taken along a position passing through the article 201 without passing through the RFID tag 105.

FIG. 18A is a perspective view of an RFID tag-equipped article 304, and FIG. 18B is a sectional view of the RFID tag-equipped article 304, taken along a position passing through an article 201 without passing through the RFID tag 105. The RFID tag-equipped article 304 is formed by attaching the RFID tag 105 to the article 201. The article 201 is a metal body, for example.

The article 201 is formed with a fitting portion 201D. The RFID tag 105 is fitted into the fitting portion 201D, and the terminals 31 and 32 are welded or screwed to the article 201.

Figure 19:
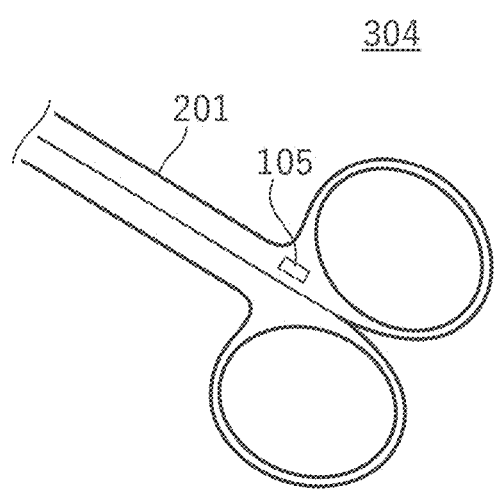
FIG. 19 is a specific partial plan view of the RFID tag-equipped article 304.

FIG. 19 is a specific partial plan view of the RFID tag-equipped article 304. The article 201 of the RFID tag-equipped article 304 is a small steel article such as a hemostat or medical scissors.

As illustrated in FIG. 19, when the article 201 with the RFID tag 105 attached is a medical instrument, it may be exposed to a high temperature environment for sterilization during use. Moreover, when the RFID tag 105 is attached to the article 201 with an adhesive, outgas may be generated from the adhesive. When the RFID tag 105 is attached to the article 201 with a rubber tube, the inside of the rubber tube cannot be sterilized, and thus sterilization cannot be sufficiently performed.

In contrast, the exemplary embodiment enables the RFID tag 105 to be attached to the article 201 by welding without using an adhesive or a rubber tube.

Seventh Exemplary Embodiment

Figure 20:
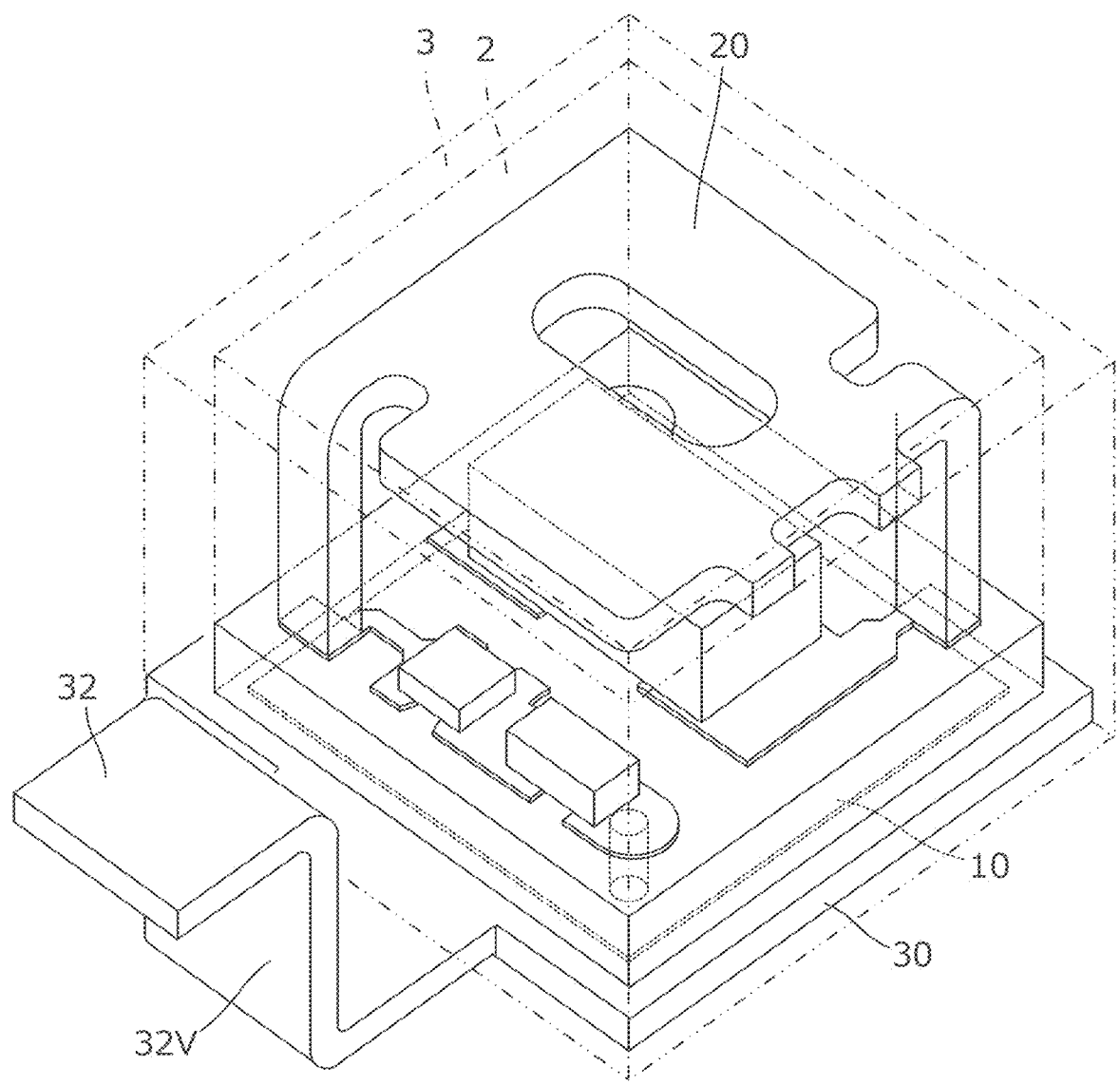
FIG. 20 is a perspective view of an RFID tag 106 according to a seventh exemplary embodiment.

The seventh embodiment shows an RFID tag having a single terminal. FIG. 20 is a perspective view of an RFID tag 106 according to the seventh embodiment.

The RFID tag 106 includes a first plane conductor 10, a second plane conductor 20, and a third plane conductor 30.

Unlike the RFID tag 105 illustrated in FIG. 16, the RFID tag 106 has a single terminal 32. It is noted that other configurations are the same as those of the RFID tag 105 as described above.

The RFID tag 106 of the present embodiment can be disposed in an end portion of an article, as in the example illustrated in FIGS. 12A and 12B.

Eighth Exemplary Embodiment

An eighth embodiment shows some examples of a connection relationship of an RFIC 40, an inductor 51, and a capacitor 52 with respect to a first plane conductor 10 and a second plane conductor 20.

Figure 21A:
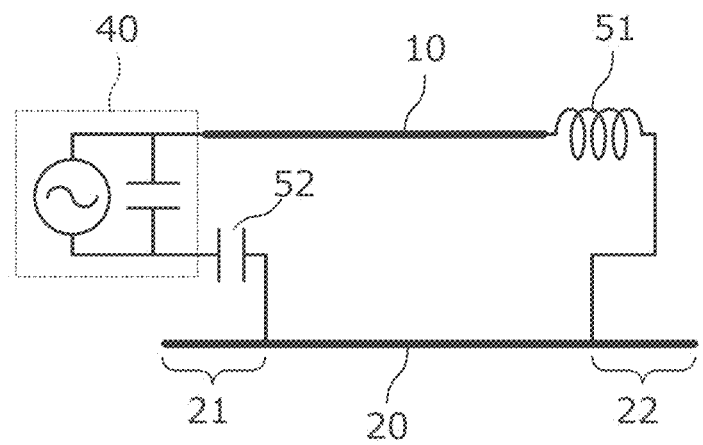
FIGS. 21A, 21B, and 21C are each a circuit diagram of an RFID tag according to an eighth exemplary embodiment.
Figure 21B:
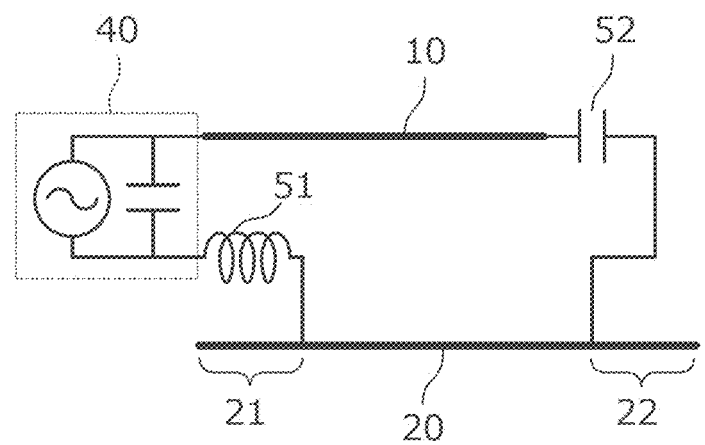
Figure 21C:
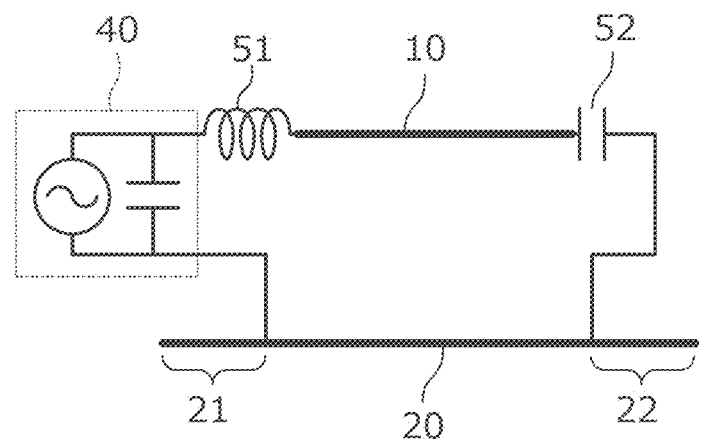

FIGS. 21A, 21B, and 21C are each a circuit diagram of an RFID tag according to the eighth embodiment. The RFID tag is different from the RFID tag illustrated in FIG. 1A in the connection relationship of the RFIC 40, the inductor 51, and the capacitor 52 with respect to the first plane conductor 10 and the second plane conductor 20.

FIG. 21A shows an example in which a first end of the inductor 51 is connected to the first plane conductor 10, a first end of the capacitor 52 is connected to the first plane conductor 10 through the RFIC 40, and a second end of the inductor 51 and a second end of the capacitor 52 are connected to the second plane conductor 20.

FIG. 21B shows an example in which a first end of the capacitor 52 is connected to the first plane conductor 10, a first end of the inductor 51 is connected to the first plane conductor 10 through the RFIC 40, and a second end of the inductor 51 and a second end of the capacitor 52 are connected to the second plane conductor 20.

FIG. 21C shows an example in which the first end of the inductor 51 is connected to the first plane conductor 10, the first end of the capacitor 52 is connected to the first plane conductor 10, the second end of the inductor 51 is connected to the second plane conductor 20 through the RFIC 40, and the second end of the capacitor 52 is connected to the second plane conductor 20.

In general, it is noted that any one of the exemplary RFID tags illustrated in FIGS. 21A, 21B, and 21C allows the RFIC 40, the capacitor 52, the first plane conductor 10, the inductor 51, and the second plane conductor 20 to form a closed current loop.

The closed current loop forms an LC resonance circuit including the capacitor 52 and the inductor 51, so that a plane conductor (the first plane conductor 10 or the second plane conductor 20) that is a connection point between the capacitor 52 and the inductor 51, and a plane conductor (the second plane conductor 20 or the first plane conductor 10) to which the second end of the inductor 51 or the second end of the capacitor 52 is connected, have the largest potential difference therebetween at or near a resonance frequency. That is, two places having a large potential difference in the closed current loop includes one place that is the first plane conductor 10, and the other place that is the second plane conductor 20.

Figure 22A:
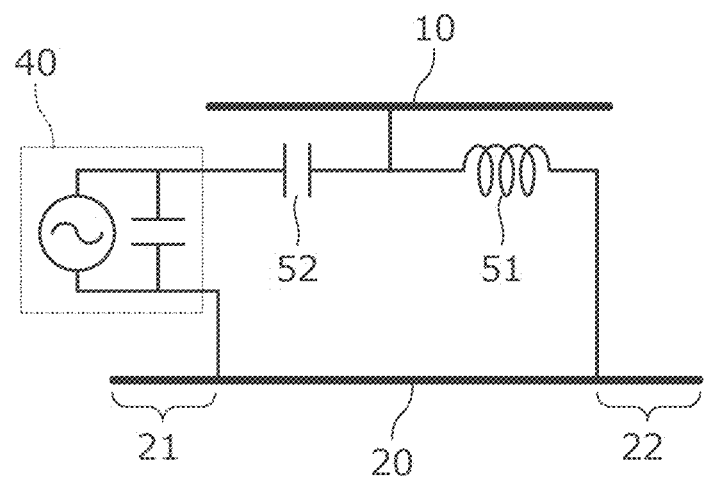
FIGS. 22A and 22B are each a circuit diagram of another RFID tag according to the eighth exemplary embodiment.
Figure 22B:
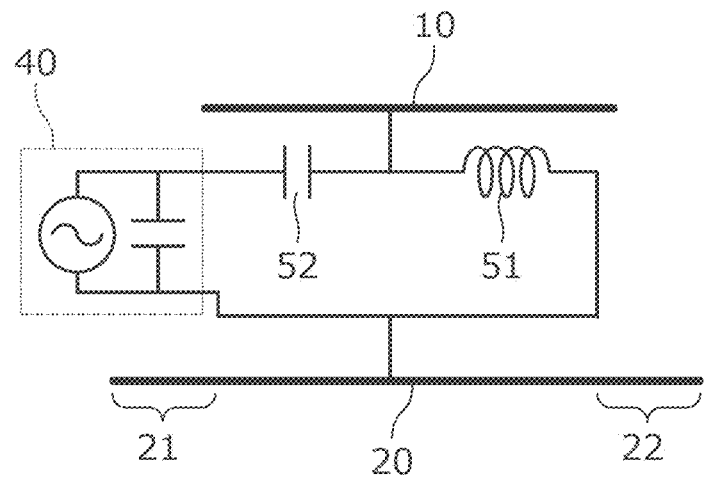

FIGS. 22A and 22B are each a circuit diagram of an RFID tag that is further different from the RFID tags illustrated in FIGS. 21A, 21B, and 21C.

FIG. 22A shows an example in which the first end of the inductor 51 and the first end of the capacitor 52 are connected at a connection point, the connection point is connected to the first plane conductor 10, the second end of the capacitor 52 is connected to the second plane conductor 20 through the RFIC 40, and the second end of the inductor 51 is connected to the second plane conductor 20.

FIG. 22B shows an example in which the first end of the inductor 51 and the first end of the capacitor 52 are connected at a connection point, the connection point is connected to the first plane conductor 10, the second end of the capacitor 52 is connected to the second end of the inductor 51 through the RFIC 40, and a connection point between the RFIC 40 and the inductor 51 is connected to the second plane conductor 20.

It is noted that the configurations shown in FIGS. 22A and 22B enable the first plane conductor 10 and the second plane conductor 20 to receive respective potentials opposite in polarity, so that the first plane conductor 10 or the second plane conductor 20 does not necessarily form a part of a closed current loop as illustrated in FIGS. 22A and 22B.

The configurations described above also apply to an RFID tag including a third plane conductor that is electrically connected to the first plane conductor 10 or that allows a capacitance to be formed between the third plane conductor and the first plane conductor 10.

Ninth Exemplary Embodiment

A ninth embodiment shows a configuration of an RFIC and an LC resonance circuit different from the RFICs and the LC resonance circuits provided in the respective RFID tags described above.

Figure 23A:
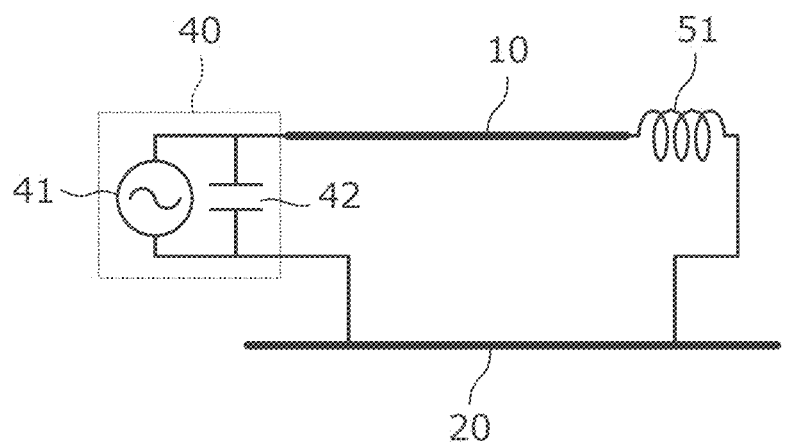
FIGS. 23A and 23B are each a circuit diagram of an RFID tag according to a ninth exemplary embodiment.
Figure 23B:
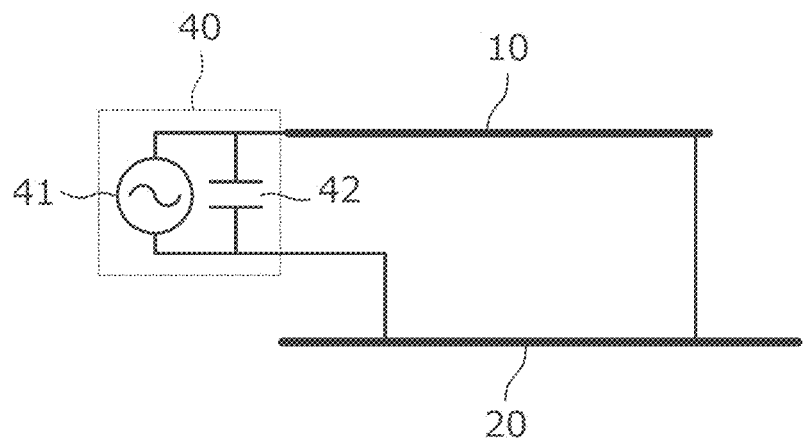

FIGS. 23A and 23B are each a circuit diagram of an RFID tag according to the ninth embodiment. FIG. 23A shows an example in which the RFID tag is composed of a first plane conductor 10, a second plane conductor 20, an RFIC 40, and an inductor 51. This example allows a built-in capacitor 42 in the RFIC 40 to be used as a capacitor of the LC resonance circuit. FIG. 23B shows an example in which the RFID tag is composed of the first plane conductor 10, the second plane conductor 20, and the RFIC 40. This example allows inductance components of the first plane conductor 10 and the second plane conductor 20 to be used as an inductor of the LC resonance circuit.

As illustrated in the present embodiment, the inductor and the capacitor for forming the LC resonance circuit are each not necessarily composed of a mounted component.

Finally, it is generally noted that the above description of the exemplary embodiments is illustrative in all respects and not restrictive. Those skilled in the art can appropriately make modifications and alterations.

For example, although the example provided with the article to which the RFID tag is attached, being a metal article, is shown in each of the above embodiments, an article having a portion with at least a metal surface may be provided to allow a terminal of an RFID tag to be attached to the metal portion.

Although the terminal of the RFID tag is welded to the article in each of the above embodiments, the terminal may be screwed to the article in an alternative aspect.

Additionally, the communication frequency is not limited to the 900 MHz band, and can be similarly applied to another frequency bands such as a 2.45 GHz band, for example.

Although the example in which the RFIC 40 including the built-in capacitor 42 is used is shown in each of the embodiments described above, the built-in capacitor 42 is not indispensable in alternative aspects.

REFERENCE SIGNS LIST 1 insulating base material
2, 3 insulator layer
first plane conductor 11, 12, 13, 14, 15 electrode
20 second plane conductor
21, 22 terminal
21V, 22V extension portion
23, 24 leg
30 third plane conductor
31, 32 terminal
31V, 32V extension portion
33 dielectric layer
40 RFIC
41 communication circuit
42 built-in capacitor
51 inductor
52 capacitor
61, 62 via conductor
101, 102, 103, 104A, 104B, 105, 106 RFID tag
201 article
201D fitting portion
301, 302, 303, 304 RFID tag-equipped article

The invention claimed is:

1. An RFID tag comprising:
a first plane conductor;
a second plane conductor that at least partially faces the first plane conductor;
an RFIC, a capacitor, and an inductor that form a part of a closed current loop; and
at least one terminal,
wherein the closed current loop has a first connection point electrically connected to the first plane conductor, and a second connection point electrically connected to the second plane conductor, such that a potential of the first connection point is different than a potential of the second connection point, and
wherein the at least one terminal projects outward from a region where the first plane conductor faces the second plane conductor.

2. The RFID tag according to claim 1, wherein the second plane conductor entirely faces the first plane conductor.

3. The RFID tag according to claim 1, wherein the at least one terminal is electrically connected to the second plane conductor.

4. The RFID tag according to claim 1, further comprising:
a third plane conductor that is electrically connected to the first plane conductor,
wherein the at least one terminal is electrically connected the third plane conductor and projects outward from an outer edge of the first plane conductor in a direction parallel thereto.

5. The RFID tag according to claim 1, further comprising:
a third plane conductor that forms a capacitor with the first plane conductor,
wherein the at least one terminal is electrically connected the third plane conductor and projects outward from an outer edge of the first plane conductor in a direction parallel thereto.

6. The RFID tag according to claim 1, wherein:
the first plane conductor is a plane conductor disposed on a circuit board,
the second plane conductor is a metal plate, and
the at least one terminal is disposed on a part of an outer edge of the metal plate.

7. The RFID tag according to claim 6, wherein the at least one terminal extends in a direction parallel to the second plane conductor.

8. The RFID tag according to claim 4, wherein:
the first plane conductor is a plane conductor disposed on a circuit board,
the third plane conductor is a metal plate, and
the at least one terminal is disposed on a part of an outer edge of the metal plate.

9. The RFID tag according to claim 5, wherein:
the first plane conductor is a plane conductor disposed on a circuit board,
the third plane conductor is a metal plate, and
the at least one terminal is disposed on a part of an outer edge of the metal plate.

10. The RFID tag according to claim 1, wherein the first plane conductor is coupled between the capacitor and the inductor to form the part of the closed current loop.

11. The RFID tag according to claim 10, wherein the at least one terminal comprises a pair of terminals that extend on opposing sides of the second plane conductor and extend in a direction parallel thereto.

12. The RFID tag according to claim 11, wherein the RFIC couples the capacitor to the second plane conductor and the inductor couples the first plane conductor to the second plane conductor.

13. An RFID tag-equipped article comprising:
an article; and
an RFID tag having at least one terminal fixed to the article and including:
a first plane conductor;
a second plane conductor that at least partially faces the first plane conductor; and
an RFIC, a capacitor, and an inductor that form a part of a closed current loop that has a first connection point electrically connected to the first plane conductor, and a second connection point electrically connected to the second plane conductor, such that a potential of the first connection point is different than a potential of the second connection point,
wherein the at least one terminal projects outward from a region where the first plane conductor faces the second plane conductor.

14. The RFID tag-equipped article according to claim 13, wherein the at least one terminal is fixed to the article by welding or screwing.

15. The RFID tag-equipped article according to claim 13, wherein the article includes a fitting portion into which at least a part of the RFID tag is fitted, and the at least one terminal is attached to the article with the RFID tag fitted in the fitting portion.

16. The RFID tag-equipped article according to claim 13, wherein the second plane conductor entirely faces the first plane conductor.

17. The RFID tag-equipped article according to claim 13, wherein the at least one terminal is electrically connected to the second plane conductor.

18. The RFID tag-equipped article according to claim 13, further comprising:
a third plane conductor that is electrically connected to the first plane conductor,
wherein the at least one terminal is electrically connected the third plane conductor and projects outward from an outer edge of the first plane conductor in a direction parallel thereto.

19. The RFID tag-equipped article according to claim 13, further comprising:
a third plane conductor that forms a capacitor with the first plane conductor,
wherein the at least one terminal is electrically connected the third plane conductor and projects outward from an outer edge of the first plane conductor in a direction parallel thereto.

20. The RFID tag-equipped article according to claim 13, wherein:
the first plane conductor is a plane conductor disposed on a circuit board,
the second plane conductor is a metal plate, and
the at least one terminal is disposed on a part of an outer edge of the metal plate.

21. An RFID tag comprising:
a first plane conductor;
a second plane conductor that at least partially faces the first plane conductor;
an RFIC, a capacitor, and an inductor that form a part of a closed current loop;
at least one terminal; and
an insulating base material that covers the second plane conductor, the RFIC, the capacitor and the inductor,
wherein the first plane conductor is disposed on a surface of the insulating base material opposite the second plane conductor,
wherein the closed current loop has a first connection point electrically connected to the first plane conductor, and a second connection point electrically connected to the second plane conductor,
wherein the at least one terminal protrudes from the insulating base material and projects outward from a region where the first plane conductor faces the second plane conductor.

* * * * *